(12) United States Patent
Wen et al.

(10) Patent No.: US 9,420,351 B2
(45) Date of Patent: Aug. 16, 2016

(54) SYSTEMS AND METHODS FOR PREFETCHING ONLINE CONTENT ITEMS FOR LOW LATENCY DISPLAY TO A USER

(71) Applicant: GOOGLE INC., Mountain View, CA (US)

(72) Inventors: Kai Wen, Fremont, CA (US); Lawrence Brian Landry, Mountain View, CA (US); Jianfeng Yang, San Jose, CA (US); Ramesh Sarukkai, Los Gatos, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 14/298,169

(22) Filed: Jun. 6, 2014

(65) Prior Publication Data

US 2015/0358689 A1 Dec. 10, 2015

(51) Int. Cl.
| | |
|---|---|
| *H04N 7/10* | (2006.01) |
| *H04N 21/81* | (2011.01) |
| *H04N 21/235* | (2011.01) |
| *H04L 29/06* | (2006.01) |
| *G06Q 30/02* | (2012.01) |
| *H04N 21/433* | (2011.01) |
| *H04N 21/442* | (2011.01) |
| *H04L 29/08* | (2006.01) |

(52) U.S. Cl.
CPC ............ *H04N 21/812* (2013.01); *G06Q 30/02* (2013.01); *G06Q 30/0241* (2013.01); *H04L 65/40* (2013.01); *H04L 65/4084* (2013.01); *H04L 67/20* (2013.01); *H04L 67/2847* (2013.01); *H04N 21/235* (2013.01); *H04N 21/4331* (2013.01); *H04N 21/44209* (2013.01); *H04N 21/44222* (2013.01)

(58) Field of Classification Search
CPC .. H04N 21/812; H04N 21/4532; H04N 7/165
USPC ............... 725/34–36, 134, 142; 709/231, 232
See application file for complete search history.

(56) References Cited

U.S. PATENT DOCUMENTS

| | | | | |
|---|---|---|---|---|
| 7,996,566 | B1 * | 8/2011 | Sylvain | ............ H04N 7/15 709/202 |
| 8,032,409 | B1 * | 10/2011 | Mikurak | .............. 705/14.39 |
| 8,327,403 | B1 * | 12/2012 | Chilvers | ....... H04N 21/4334 725/104 |

(Continued)

FOREIGN PATENT DOCUMENTS

WO     WO-2013/151816     10/2013

OTHER PUBLICATIONS

International Search Report & Written Opinion on PCT/US2015/034479 dated Sep. 4, 2015.

(Continued)

*Primary Examiner* — Annan Shang
(74) *Attorney, Agent, or Firm* — Foley & Lardner LLP; John D. Lanza (57) ABSTRACT

A computer-implemented method for pre-fetching online content items is provided. The method uses a first computing device including a processor in communication with an output device and a memory. The method includes displaying an online publication to a user using the output device. The method also includes identifying a break point associated with the online publication. The method further includes determining, by the processor, a pre-fetch point prior to the break point. The method also includes initiating transmission of a content item into the memory at the pre-fetch point.

32 Claims, 6 Drawing Sheets

(56) References Cited

U.S. PATENT DOCUMENTS

| | | | |
|---|---|---|---|
| 8,566,867 B1* | 10/2013 | Yang | H04N 21/25891 725/32 |
| 8,595,186 B1 | 11/2013 | Mandyam et al. | |
| 2002/0107737 A1* | 8/2002 | Kaneko et al. | 705/14 |
| 2002/0162115 A1 | 10/2002 | Bruckner et al. | |
| 2002/0184503 A1* | 12/2002 | Kalker | G06T 1/0028 713/176 |
| 2003/0139966 A1 | 7/2003 | Sirota et al. | |
| 2006/0077959 A1* | 4/2006 | Beckemeyer | 370/352 |
| 2006/0282319 A1* | 12/2006 | Maggio | G06Q 30/02 705/14.19 |
| 2007/0005795 A1* | 1/2007 | Gonzalez | G06F 17/30017 709/232 |
| 2007/0220553 A1* | 9/2007 | Branam | G06Q 30/02 725/46 |
| 2008/0134249 A1* | 6/2008 | Yang | H04N 7/17318 725/46 |
| 2008/0235087 A1* | 9/2008 | Amento | G06Q 30/02 705/14.54 |
| 2008/0235740 A1* | 9/2008 | Gupta | H04N 21/4331 725/86 |
| 2008/0319802 A1* | 12/2008 | Abraham | G06Q 40/08 705/4 |
| 2009/0005010 A1* | 1/2009 | Dote et al. | 455/412.1 |
| 2009/0019061 A1* | 1/2009 | Scannell, Jr. | 707/10 |
| 2009/0106792 A1* | 4/2009 | Kan | H04N 7/17318 725/34 |
| 2009/0164550 A1* | 6/2009 | Rahrer | H04L 41/0677 709/202 |
| 2009/0193453 A1* | 7/2009 | Cansler | H04N 21/4331 725/32 |
| 2009/0210899 A1* | 8/2009 | Lawrence-Apfelbaum | H04L 12/2801 725/34 |
| 2009/0231434 A1* | 9/2009 | Fitzgibon | H05B 37/0227 348/156 |
| 2010/0205049 A1* | 8/2010 | Long | G06Q 30/02 705/14.5 |
| 2010/0325657 A1 | 12/2010 | Sellers et al. | |
| 2011/0167486 A1 | 7/2011 | Ayloo et al. | |
| 2011/0218864 A1* | 9/2011 | Pentz | G06Q 30/0241 705/14.71 |
| 2011/0320280 A1 | 12/2011 | Ramer et al. | |
| 2012/0041819 A1 | 2/2012 | Ramer et al. | |
| 2012/0254301 A1* | 10/2012 | Fiero | G06F 17/3005 709/203 |
| 2012/0303796 A1* | 11/2012 | Mo | H04L 12/1403 709/224 |
| 2012/0311629 A1* | 12/2012 | Zaslavsky | H04N 21/262 725/34 |
| 2013/0024894 A1 | 1/2013 | Eyer | |
| 2013/0247081 A1* | 9/2013 | Vinson | H04N 21/44204 725/14 |
| 2013/0308818 A1* | 11/2013 | MacIntosh | G06T 1/0021 382/100 |
| 2014/0130072 A1* | 5/2014 | Maeda | H04H 60/31 725/12 |
| 2014/0250479 A1* | 9/2014 | Lee | H04N 7/08 725/110 |
| 2015/0143394 A1* | 5/2015 | Hijikata | H04N 21/45457 725/14 |
| 2015/0156528 A1* | 6/2015 | Xu | H04N 21/25825 725/62 |

OTHER PUBLICATIONS

Society of Cable Telecommunications Engineers. Engineering Committee Digital Video Subcommittee. SCTE 67 2014.

* cited by examiner

SYSTEMS AND METHODS FOR PREFETCHING ONLINE CONTENT ITEMS FOR LOW LATENCY DISPLAY TO A USER

BACKGROUND

This specification relates to presenting online content items in combination with online publications, and more particularly to a network-based system and method for pre-fetching online content items for low latency display to a user during a presentation of an online publication.

Internet users are able to view publications (e.g., video publications) on user devices. At least some of these publications include movies, television programs, and other videos that the user views with, for example, their mobile computing device. These publications may be online publications (e.g., Internet-streaming videos) or offline publications (e.g., videos stored on the mobile computing device), and are displayed along with online content items (e.g., video advertisements) where the online content item is displayed at a predetermined time during the display of the publication (e.g., before, during, or after).

In some known systems, a video publication is displayed on a user device, and the video publication reaches a point when a video advertisement is to be displayed to the user, the user device transmits a call to an online content provider. The online content provider serves an appropriate online content item to the user device for displaying. However, in some cases, the online content provider may not have an appropriate online content item to provide to the user and instead may have to instruct the user device to request online content items from one or more other content providers. Each time a call is made by the user device to a content provider, or by the online content provider to other online content providers, these operations cause further delay in serving and displaying the online content item to the user. In addition, some formats of online content items (e.g., video advertisements) may require a longer buffer time, which may cause additional delays. These delays can frustrate the user.

BRIEF DESCRIPTION OF THE DISCLOSURE

In one aspect, a computer-implemented method for pre-fetching online content items is provided. The method uses a first computing device including a processor in communication with an output device and a memory. The method includes displaying an online publication to a user using the output device. The method also includes identifying a break point associated with the online publication. The method further includes determining, by the processor, a pre-fetch point prior to the break point. The method also includes initiating transmission of a content item into the memory at the pre-fetch point.

In another aspect, a computer system is provided. The computer system includes an output device and at least one memory. The computer system also includes one or more processors configured to display an online publication to a user using said output device. The one or more processors are also configured to identify a break point associated with the online publication. The one or more processors are further configured to determine a pre-fetch point prior to the break point. The one or more processors are also configured to initiate transmission of a content item into the memory at the pre-fetch point.

In yet another aspect, computer-readable storage media having computer-executable instructions embodied thereon are provided. When executed by at least one processor, the computer-executable instructions cause the processor to display an online publication to a user using an output device. The computer-executable instructions also cause the at least one processor to identify a break point associated with the online publication. The computer-executable instructions further cause the at least one processor to determine a pre-fetch point prior to the break point. The computer-executable instructions also cause the at least one processor to initiate transmission of a content item from a second computing device to the processor at the pre-fetch point.

In yet another aspect, a computer device comprising one or more processors is provided. The computer device is in communication with a client device including a memory and an output device. The computer device is configured to display an online publication to a user using said output device. The computer device is also configured to identify a break point associated with the online publication. The computer device is further configured to determine a pre-fetch point prior to the break point. The computer device is also configured to initiate transmission of a content item from the computer device into the memory of the client device at the pre-fetch point.

BRIEF DESCRIPTION OF THE DRAWINGS

FIGS. 1-6 show example embodiments of the methods and systems described herein.

Like reference numbers and designations in the various drawings indicate like elements.

DETAILED DESCRIPTION OF THE DISCLOSURE

Embodiments of the methods and systems described herein enable low latency display of online content items (e.g., "ads" or "advertisements") during the presentation of online publications such as Internet videos or videos stored on a user's computing device. More specifically, the methods and systems described herein facilitate pre-fetching content items from an online content provider such that at the time of presentation, some or all of the upcoming ads are stored locally and available for immediate presentation. The pre-fetch system includes a server computing device in communication with a client device and a memory device.

For example, a user may be watching online publications on the client device (e.g., mobile tablet computer or smart-phone) through, for example, an online video sharing web site in which users are able to upload, download, and stream video content. During presentation of the online publication (e.g., online video), the pre-fetch system presents the user with one or more video ads. The user may be presented on the client device with an ad prior to the start of the video, and/or at one or more points during the video (collectively referred to herein as "ad break points"). As the video presentation approaches an ad break point, the pre-fetch system pre-fetches an ad. More specifically, pre-fetch system retrieves the next ad from an online content provider and stores the ad locally on the client device for display during the upcoming ad slot. The pre-fetch system identifies an ad break point within a video being displayed to the user, and determines a time prior to the ad break point to begin pre-fetching the ad (a "pre-fetch point").

In some embodiments, the next ad is pre-fetched at a pre-determined amount of time prior to the ad break point, (i.e., a "pre-fetch gap time" between the beginning of the pre-fetch and the ad break point, such as 10 seconds before the next ad is due to be displayed). In other embodiments, this pre-fetch gap time may be computed based on a variety of factors such as: (a) the bandwidth quality of the mobile device or the mobile device's current connection; (b) the available disk space on the mobile device; (c) the user's configuration profile; and (d) historical user behavior. For example, the pre-fetch system may determine that the mobile device presently has a low-quality (i.e., low bandwidth) connection, and thus may increase the pre-fetch gap to allow for more pre-fetching time. Further, the pre-fetch system may pre-fetch only a portion of the next ad (a partial pre-fetch). More specifically, the pre-fetch system may determine a portion of the next ad that will be pre-fetched (e.g., a "pre-fetch length" representing the first X seconds of the ad). This pre-fetch length may be computed based on the user's behavior history, or how long the user is likely to view the ad, or on bandwidth quality of the user's mobile device or the mobile device's current connection, or on the available disk and/or memory space on the mobile device. As such, the system may increase the amount of the ad that is pre-fetched when the user is more likely to watch most or all of the ad.

The methods and systems described herein may be implemented using computer programming or engineering techniques including computer software, firmware, hardware, or any combination or subset thereof, wherein the technical effects may be achieved by performing at least one of the following steps: (a) displaying an online publication to a user using the output device; (b) identifying a break point associated with the online publication; (c) determining, by a processor, a pre-fetch point prior to the break point; (d) initiating transmission of a content item into the memory at the pre-fetch point; (e) displaying the online content item to the user using the output device; (f) determining a pre-fetch point that is a pre-determined amount of time prior to the break point; (g) computing a pre-fetch gap time based on one or more of a link quality of the first computing device, a bit rate of the first computing device, a size of the content item, and a download rate of the first computing device; (h) determining a pre-fetch length of the content item that is less than a total length of the content item, wherein initiating transmission of a content item further includes initiating transmission of a first portion of the content item approximately equal to the pre-fetch length; (i) determining a pre-fetch length base on one or more of historical user behavior of the user, a user profile, a bit rate of the content item, and available storage space in the memory; (j) selecting the content item based at least in part on one or more attributes of the online publication; (k) initiating transmission of the content item from a second computing device to the first computing device, wherein the second computing device is a server device; and (l) initiating transmission of the content item from the first computing device to a second computing device, wherein the second computing device is a client device that includes the memory and the output device.

In some known systems, startup and streaming of ad content may take several seconds of processing before the displaying of the ad begins (e.g., "latency"). This latency is often dependent upon the time required to transfer a few seconds of video from a server to the client device (e.g., the user's device). In contrast, the pre-fetch system described herein retrieves ads just prior to the time they are needed. Overall technical effects of this pre-fetch system include at least improving the latency issue of prior systems by pre-fetching and storing the next ad locally on the client device, and reducing abandonment rates for advertisements (i.e., the number of ads that are retrieved but not watched) by pre-fetching the next ad just prior to its display. With this improved (e.g., lower latency) system, the user may be less likely to feel that the system is slow and, thus, may be more likely to view more content and for a longer duration.

The following detailed description illustrates embodiments of the disclosure by way of example and not by way of limitation. It is contemplated that the disclosure has general application to the presentation of content items such as online advertisements during presentation of online content items.

As used herein, an element or step recited in the singular and proceeded with the word "a" or "an" should be understood as not excluding plural elements or steps, unless such exclusion is explicitly recited. Furthermore, references to "one embodiment" of the present disclosure are not intended to be interpreted as excluding the existence of additional embodiments that also incorporate the recited features.

Figure 1:
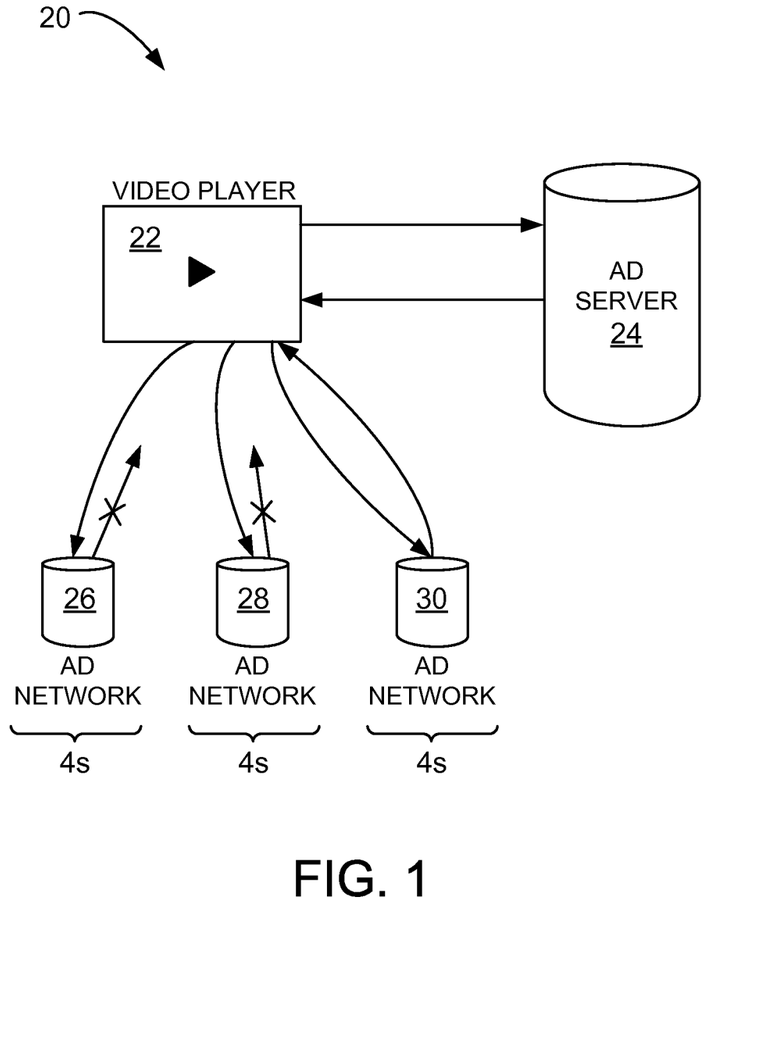
FIG. 1 is a dataflow diagram showing a known data flow between a video player operating on a user device, an ad server, and a plurality of ad networks.

FIG. 1 is a dataflow diagram showing a known synchronous data flow 20 between a video player 22 operating on a user device (e.g., "client device", not separately shown in FIG. 1), an ad server 24, and a plurality of ad networks 26, 28, and 30. In known systems for synchronously serving video ads, video player 22 displays video content such as movies, television programs and other videos (e.g., publications), as well as video ads (e.g., content items), to a user. When the video player 22 determines that a video ad is to be displayed (e.g., an ad breakpoint), the video player 22 requests a video ad from the ad server 24. The video player 22 generates and transmits a video ad request to the first ad network 26. The video player 22 then starts a timer and waits for a response from the first ad network 26. If no response is received by the time the timer reaches the time-out value (e.g., four seconds later), the video player 22 generates and transmits a video ad request to the second ad network 28. The video player 22 then starts a timer and waits for a response from the second ad network 28. If no response is received by the time the timer reaches the time-out value (e.g., four seconds later), the video player 22 generates and transmits a video ad request to the third ad network 30. The video player 22 then starts a timer and waits for a response from the third ad network 30. In this case, the video player 22 receives a video ad from the third ad network and begins to play the video ad.

As seen in the known synchronous data flow 20, video advertisements do not always fill. In some situations, the video player 22 has to wait long periods of time before it can display a video advertisement (e.g., "latency"). In these situations, users are likely to lose interest in the video advertisement and the video that they were originally watching. The pre-fetching system described below addresses the latency problem of the synchronous system.

Figure 2:
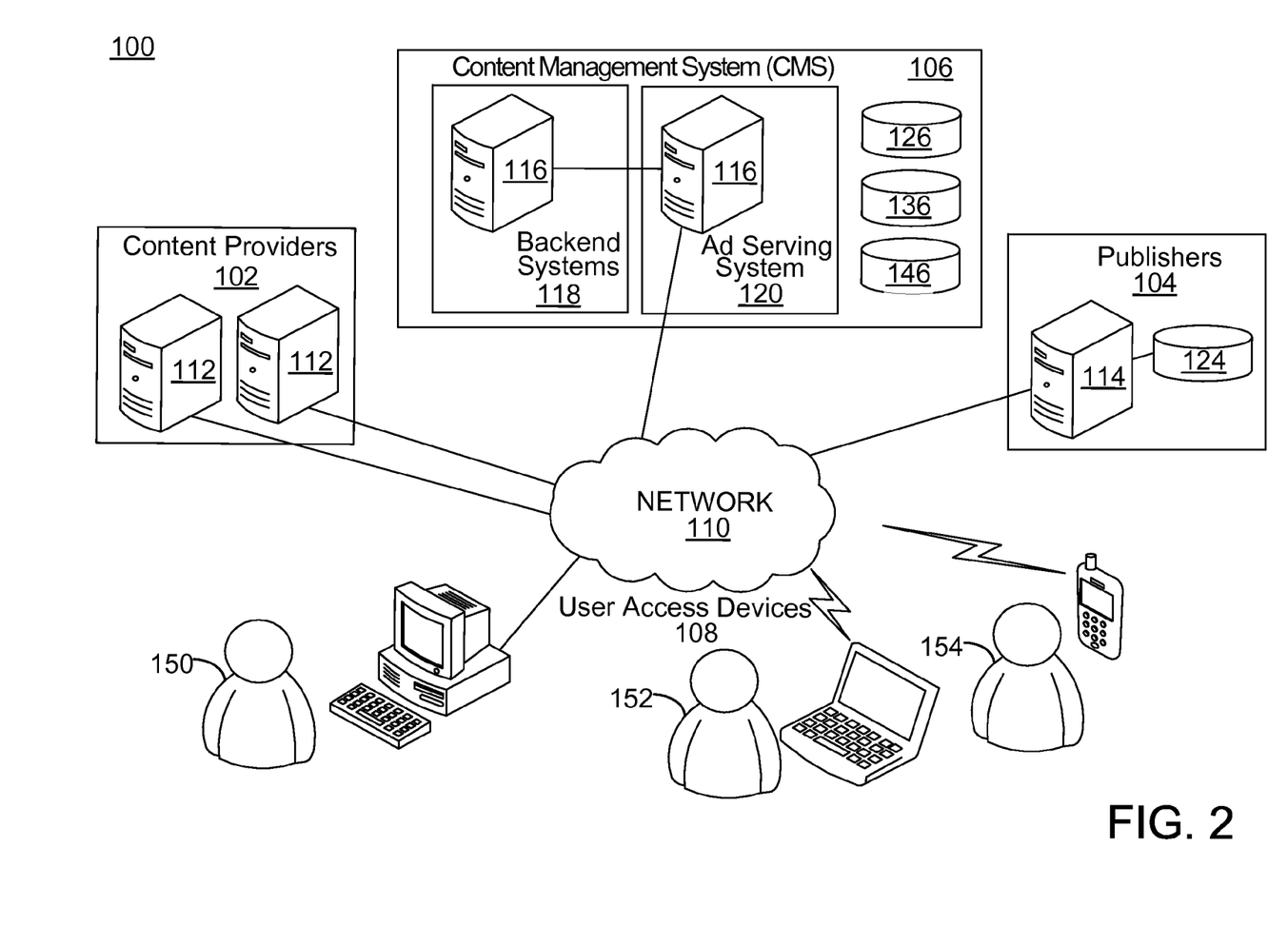
FIG. 2 is a diagram showing an example networked environment for pre-fetching and displaying content items to users in combination with publications, such as through the video player shown in FIG. 1.

FIG. 2 is a diagram showing an example networked environment for pre-fetching and displaying content items to users in combination with publications, such as through video player 22 (shown in FIG. 1). With reference to FIG. 2, an example networked environment 100 may include one or more content providers 102 (alternatively referred to herein as merchants), one or more publishers 104, a content management system (CMS) 106, and one or more user access devices 108 ("client computing devices" or just "client devices"), which may be coupled to a network 110. User access devices are used by users 150, 152, and 154. Each of the elements 102, 104, 106, 108 and 110 in FIG. 1 may be implemented or associated with hardware components, software components, or firmware components or any combination of such components. The elements 102, 104, 106, 108 and 110 can, for example, be implemented or associated with servers, software processes and engines, and/or various embedded systems. The elements 102, 104, 106 and 110 may serve, for example, as a content bidding and distribution network. In the example embodiment, content providers 102 include online advertisers, and CMS 106 is an advertising management system that enables pre-fetching of content items such as video ads.

The content providers 102 may include any entities that are associated with content (i.e., a content item or multiple content items). In some embodiments, the content includes any form of communication in which one or more products, services, ideas, messages, people, organizations or other items are identified and promoted (or otherwise communicated). Content is not limited to advertisements and commercial promotions. Rather, content may include public service announcements or any other types of notices, such as public notices published in printed or electronic press or broadcasts. In some embodiments, content providers 102 provide content items that include, for example, audio and/or video advertisements.

Content may be communicated via various mediums and in various forms. In some examples, content may be communicated through an interactive medium, such as the Internet, and may include graphical content (e.g., banner content), textual content, image content, audio content, video content, content combining one of more of any of such components, or any form of electronically delivered content. Content may include embedded information, such as embedded media, links, meta-information, and/or machine executable instructions. Content could also be communicated through RSS (Really Simple Syndication) feeds, radio channels, television channels, print media, and other media.

Content can refer to both a single "creative" and a "content group." A creative refers to any entity that represents one content impression, also referred to herein as an advertisement, or "ad." A content impression refers to any form of presentation of content such that it is viewable/receivable by a user. In some examples, a content impression may occur when content is displayed on a display device of a user access device (i.e., a "client computing device"). A content group refers, for example, to an entity that represents a group of creatives that share a common characteristic, such as having the same content selection and recommendation criteria. Content groups can be used to create a content campaign.

In some embodiments, one or more ads are affiliated with an "ad group." An ad group includes one or more ads along with other associated information related to those ads, such as, for example and without limitation, a title, a headline, a budget, targeting criteria, and keywords. In the example embodiment, an ad group includes one ad and associated information. As used herein, the term "ad" and "ad group" may be used interchangeably, as some operations that are performed relative to an ad may also be performed relative to an ad group, and vice versa.

The content providers 102 may provide (or be otherwise associated with) products and/or services related to content. The content providers 102 may include or be associated with, for example, retailers, wholesalers, warehouses, manufacturers, distributors, health care providers, educational establishments, financial establishments, technology providers, energy providers, utility providers, or any other product or service providers or distributors.

The content providers 102 may directly or indirectly generate, maintain, review, and/or analyze content, which may be related to products or services offered by or otherwise associated with the content providers 102. The content providers 102 may include or maintain one or more data processing systems 112, such as servers or embedded systems, coupled to the network 110. The content providers 102 may include or maintain one or more processes that run on one or more data processing systems. In some embodiment, some content providers 102 review online content items using, for example, systems 112 and/or CMS 106.

The publishers 104 may include any entities that generate, maintain, provide, present and/or otherwise process publications in the environment 100. "Publishers," in particular, include authors of publications, wherein authors may be individual persons, or, in the case of works made for hire, the proprietor(s) who hired the individual(s) responsible for creating the online publications. The term "publication" refers to various types of web-based, software application-based and/or otherwise presented information, including articles, discussion threads, reports, analyses, financial statements, music, video, graphics, search results, web page listings, information feeds (e.g., RSS feeds), television broadcasts, radio broadcasts, printed information, or any other form of information that may be presented to a user using a computing device such as one of user access devices 108.

In some implementations, the publishers 104 may include publishers with an Internet presence, such as online publication and news providers (e.g., online newspapers, online magazines, television websites, etc.), online service providers (e.g., financial service providers, health service providers, etc.), and the like. The publishers 104 can include software application providers, television broadcasters, radio broadcasters, satellite broadcasters, and other providers of publications. One or more of the publishers 104 may represent a publication network that is associated with the CMS 106.

The publishers 104 may receive requests from the user access devices 108 (or other elements in the environment 100) and provide or present publications to the requesting devices. The publishers may provide or present publications via various mediums and in various forms, including web based and non-web based mediums and forms. The publishers 104 may generate and/or maintain such publications and/or retrieve the publications from other network resources.

In addition to publications, the publishers 104 may be configured to integrate or combine retrieved publications with content that is related or relevant to the retrieved publication for display to users 150, 152, and 154. The relevant content may be provided from the CMS 106 and may be combined with a publication for display to users 150, 152, and 154. In some examples, the publishers 104 may retrieve a publication for display on a particular user access device 108 and then forward the publication to the user access device 108 along with code that causes content from the CMS 106 to be displayed to the user 150, 152, or 154. In other examples, the publishers 104 may retrieve a publication, retrieve relevant content (e.g., from the CMS 106 or the content providers 102), and then integrate the content and the publication to form a page for display to the user 150, 152, or 154. In still other examples, the publishers 104 may provide online content space for sale to advertisers, such as content providers 102. Such content space may be populated with content items from the content providers 102, and may be presented to the user 150, 152, or 154 along with the publications.

As noted above, one or more of the publishers 104 may represent a publication network. In such an implementation, the content providers 102 may be able to present content to users through this publication network. Further, in some embodiments, content providers 102 bid on online content items, for example, through CMS 106.

The publishers 104 may include or maintain one or more data processing systems 114, such as servers or embedded systems, coupled to the network 110. They may include or maintain one or more processes that run on data processing systems. In some examples, the publishers 104 may include one or more publication repositories 124 for storing publications and other information. Additionally, in some embodiments, publishers 104 and/or content providers 102 may review online content items using, for example, system 114 and/or CMS 106.

The CMS 106 manages content and provides various services to the content providers 102, the publishers 104, and the user access devices 108. The CMS 106 may store content in a content repository 126 and facilitate the distribution or selective provision and recommendation of content through the environment 100 to the user access devices 108.

The CMS 106 may include one or more data processing systems 116, such as servers or embedded systems, coupled to the network 110. It can also include one or more processes, such as server processes. In some examples, the CMS 106 may include a content serving system 120 and one or more backend processing systems 118. The content serving system 120 may include one or more data processing systems 116 and may perform functionality associated with delivering content to publishers or user access devices 108. The backend processing systems 118 may include one or more data processing systems 116 and may perform functionality associated with identifying relevant content to deliver, processing various rules, performing filtering processes, generating reports, maintaining accounts and usage information, auctioning online content items, and other backend system processing. The CMS 106 can use the backend processing systems 118 and the content serving system 120 to selectively recommend and provide relevant content from the content providers 102 through the publishers 104 to the user access devices 108.

The CMS 106 may include or access one or more crawling, indexing and searching modules (not shown). These modules may browse accessible resources (e.g., the World Wide Web, publisher content, data feeds, etc.) to identify, index and store information. The modules may browse information and create copies of the browsed information for subsequent processing. The modules may also check links, validate code, harvest information, and/or perform other maintenance or other tasks.

Searching modules may search information from various resources, such as the World Wide Web, publications, intranets, newsgroups, databases, and/or directories. The search modules may employ one or more known search or other processes to search data. In some implementations, the search modules may index crawled content and/or content received from data feeds to build one or more search indices. The search indices may be used to facilitate rapid retrieval of information relevant to a search query. Searching modules may also store search results including one or more of search query terms, search results elements, and ads impressions served.

The CMS 106 may include one or more interface or frontend modules for providing the various features to content providers, publishers, and user access devices. For example, the CMS 106 may provide one or more publisher front-end interfaces (PFEs) for allowing publishers to interact with the CMS 106. The CMS 106 may also provide one or more content provider front-end interfaces (CPFEs) for allowing content providers to interact with the CMS 106. In some examples, the front-end interfaces may be configured as web applications that provide users with network access to features available in the CMS 106.

The CMS 106 provides various content management features to the content providers 102. The CMS 106 features may allow users to set up user accounts, set account preferences, create content, select keywords for content, create campaigns or initiatives for multiple products or businesses, view reports associated with accounts, analyze costs and return on investment, selectively identify customers in different regions, selectively recommend and provide content to particular publishers, analyze financial information, analyze content performance, estimate content traffic, access keyword tools, add graphics and animations to content, and review content items as described herein.

The CMS 106 may allow the content providers 102 to create content and input keywords for which the content will appear. In some examples, the CMS 106 may provide content to user access devices or publishers when keywords associated with that content are included in a user request or a requested publication. The CMS 106 may also allow the content providers 102 to set bids for content. A bid may represent the maximum amount a content provider is willing to pay for each content impression, user click-through of content or other interaction with content. A click-through can include any action a user takes to select content. The content providers 102 may also choose a currency and monthly budget.

The CMS 106 may also allow the content providers 102 to view information about content impressions, which may be maintained by the CMS 106. The CMS 106 may be configured to determine and maintain the number of content impressions relative to a particular website or keyword. The CMS 106 may also determine and maintain the number of click-trough's for content as well as the ratio of click-trough's to impressions.

The CMS 106 may also allow the content providers 102 to select and/or create conversion types for content. A "conversion" may occur when a user consummates a transaction related to given content. A conversion could be defined to occur when a user clicks on content, for example a specific content item, is referred to the content provider's web page, and consummates a purchase there before leaving that web page. In another example, a conversion could be defined as the display of content to a user and a corresponding purchase on the content provider's web page within a predetermined time (e.g., seven days). The CMS 106 may store conversion data and other information in a conversion data repository 136.

The CMS 106 may allow the content providers 102 to input description information associated with content. This information could be used to assist the publishers 104 in determining content to publish. The content providers 102 may additionally input a cost/value associated with selected conversion types, such as a five dollar credit to the publishers 104 for each product or service purchased.

The CMS 106 may provide various features to the publishers 104. The CMS 106 may deliver content (associated with the content providers 102) to the user access devices 108 when users access publications from the publishers 104. The CMS 106 can be configured to deliver content that is relevant to publisher sites, publications, and publisher audiences.

In some examples, the CMS 106 may crawl publications provided by the publishers 104 and deliver content that is relevant to publisher sites, publications and publisher audiences based on the crawled publications. The CMS 106 may also selectively recommend and/or provide content based on user information and behavior, such as particular search queries performed on a search engine website. In some examples, the CMS 106 can add search to a publisher site and deliver content configured to provide appropriate and relevant content relative to search results generated by requests from visitors of the publisher site. A combination of these and other approaches can be used to deliver relevant content.

The CMS 106 may allow the publishers 104 to search and select specific products and services as well as associated content to be displayed with publications provided by the publishers 104. For example, the publishers 104 may search through content in the content repository 126 and select certain content for display with their publications.

The CMS 106 may be configured to selectively recommend and provide content created by the content providers 102 to the user access devices 108 directly or through the publishers 104. The CMS 106 may selectively recommend and provide content to a particular publisher 104 (as described in further detail herein) or a requesting user access device 108 when a user requests search results or loads a publication from the publisher 104.

In some implementations, the CMS 106 may manage and process financial transactions among and between elements in the environment 100. For example, the CMS 106 may credit accounts associated with the publishers 104 and debit accounts of the content providers 102. These and other transactions may be based on conversion data, impressions information and/or click-through rates received and maintained by the CMS 106.

"Computing devices", for example user access devices 108, may include any devices capable of receiving information from the network 110. The user access devices 108 could include general computing components and/or embedded systems optimized with specific components for performing specific tasks. Examples of user access devices include personal computers (e.g., desktop computers), mobile computing devices, cell phones, smart phones, head-mounted computing devices, media players/recorders, music players, game consoles, media centers, media players, electronic tablets, personal digital assistants (PDAs), television systems, audio systems, radio systems, removable storage devices, navigation systems, set top boxes, other electronic devices and the like. The user access devices 108 can also include various other elements, such as processes running on various machines.

The network 110 may include any element or system that facilitates communications among and between various network nodes, such as elements 108, 112, 114 and 116. The network 110 may include one or more telecommunications networks, such as computer networks, telephone or other communications networks, the Internet, etc. The network 110 may include a shared, public, or private data network encompassing a wide area (e.g., WAN) or local area (e.g., LAN). In some implementations, the network 110 may facilitate data exchange by way of packet switching using the Internet Protocol (IP). The network 110 may facilitate wired and/or wireless connectivity and communication.

For purposes of explanation only, certain aspects of this disclosure are described with reference to the discrete elements illustrated in FIG. 2. The number, identity and arrangement of elements in the environment 100 are not limited to what is shown. For example, the environment 100 can include any number of geographically-dispersed content providers 102, publishers 104 and/or user access devices 108, which may be discrete, integrated modules or distributed systems. Similarly, the environment 100 is not limited to a single CMS 106 and may include any number of integrated or distributed CMS systems or elements.

Furthermore, additional and/or different elements not shown may be contained in or coupled to the elements shown in FIG. 2, and/or certain illustrated elements may be absent. In some examples, the functions provided by the illustrated elements could be performed by less than the illustrated number of components or even by a single element. The illustrated elements could be implemented as individual processes running on separate machines or a single process running on a single machine.

In some embodiments, the CMS 106 is a provider of online publications such as online videos, and presents the online publications to client devices for display to the user. In some embodiments, the CMS 106 provides pre-fetching services for a consumer of publications and content items, such as users 150, 152, and 154, through communication with user access devices 108. In other embodiments, the user access devices 108 perform pre-fetching operations, and may interact directly or indirectly with one or more of content providers 102, publishers 104, and/or CMS 106. In the example embodiment, the pre-fetch system may include one or more user access devices 108 ("client devices") in communication with one or more "server devices" (e.g., CMS 106, publisher 104, content provider 102, or any other computing device in the environment 100 that supports the systems and methods described herein).

Figure 3:
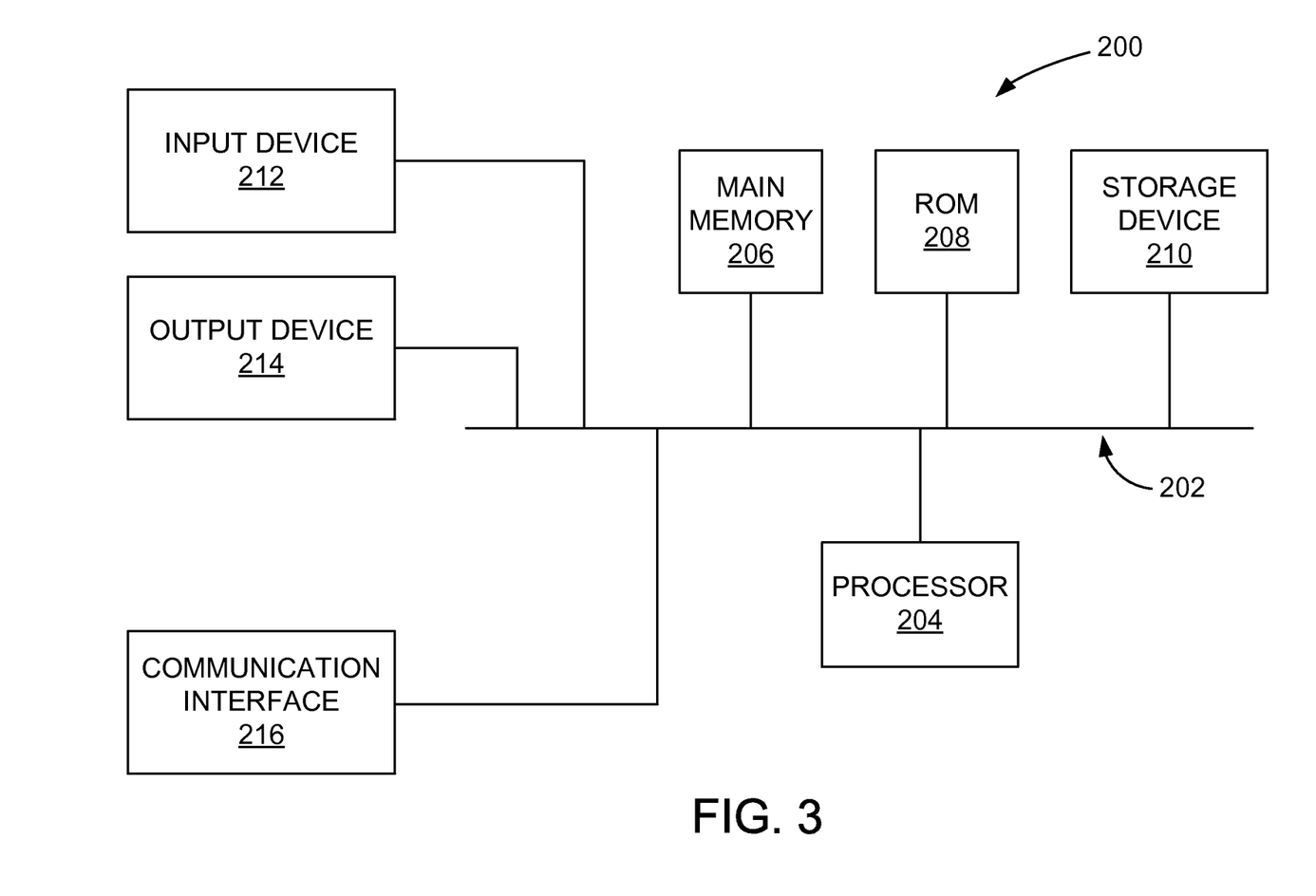
FIG. 3 is a block diagram of a computing device used for pre-fetching content items for presentation to a user as shown in FIG. 2.

FIG. 3 is a block diagram of a computing device 200. In the example embodiment, computing device could be any of the computing devices shown in FIG. 2, such as, for example, user access device 108 (shown in FIG. 2) or CMS 106. FIG. 3 shows an example of a computing device 200 intended to represent various forms of digital computers, such as laptops, desktops, workstations, personal digital assistants, servers, blade servers, mainframes, and other appropriate computers. Computing device 200 is also intended to represent various forms of mobile devices, such as personal digital assistants, cellular telephones, smart phones, tablet computers, and other similar computing devices that could be used for displaying publications to a user and/or pre-fetching online content items for display within those publications. The components shown here, their connections and relationships, and their functions, are meant to be examples only, and are not meant to limit implementations of the subject matter described and/or claimed in this document.

In the example embodiment, computing device 200 could be user access device 108 or any of data processing devices 112, 114, or 116 (shown in FIG. 2), wherein it is specifically configured to perform one or more of the steps described herein. In the example embodiment, computing device 200 may include a bus 202, a processor 204, a main memory 206, a read only memory (ROM) 208, a storage device 210, an input device 212, an output device 214, and a communication interface 216. Bus 202 may include a path that permits communication among the components of computing device 200.

Processor 204 may include any type of conventional processor, microprocessor, or processing logic that interprets and executes instructions. Processor 204 can process instructions for execution within the computing device 200, including instructions stored in the memory 206 or on the storage device 210 to display graphical information for a GUI on an external input/output device, such as display 214 coupled to a high speed interface. In other implementations, multiple processors and/or multiple buses may be used, as appropriate, along with multiple memories and types of memory. Also, multiple computing devices 200 may be connected, with each device providing portions of the necessary operations (e.g., as a server bank, a group of blade servers, or a multi-processor system). In some embodiments, processor 204 is transformed into a special purpose microprocessor by executing computer-executable instructions or by otherwise being programmed.

Main memory 206 may include a random access memory (RAM) or another type of dynamic storage device that stores information and instructions for execution by processor 204. ROM 208 may include a conventional ROM device or another type of static storage device that stores static information and instructions for use by processor 204. Main memory 206 stores information within the computing device 200. In one implementation, main memory 206 is a volatile memory unit or units. In another implementation, main memory 206 is a non-volatile memory unit or units. Main memory 206 may also be another form of computer-readable medium, such as a magnetic or optical disk.

Storage device 210 may include a magnetic and/or optical recording medium and its corresponding drive. The storage device 210 is capable of providing mass storage for the computing device 200. In one implementation, the storage device 210 may be or contain a computer-readable medium, such as a floppy disk device, a hard disk device, an optical disk device, or a tape device, a flash memory or other similar solid state memory device, or an array of devices, including devices in a storage area network or cloud-based storage or other configurations. A computer program product can be tangibly embodied in an information carrier. The computer program product may also contain instructions that, when executed, perform one or more methods, such as those described above. The information carrier is a computer- or machine-readable medium, such as main memory 206, ROM 208, the storage device 210, or memory on processor 204.

The high speed controller manages bandwidth-intensive operations for the computing device 200, while the low speed controller manages lower bandwidth-intensive operations. Such allocation of functions is for purposes of example only. In one implementation, the high-speed controller is coupled to main memory 206, display 214 (e.g., through a graphics processor or accelerator), and to high-speed expansion ports, which may accept various expansion cards (not shown). In the implementation, low-speed controller is coupled to storage device 210 and low-speed expansion port. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

Input device 212 may include a conventional mechanism that permits computing device 200 to receive commands, instructions, or other inputs from a user 150, 152, or 154, including visual, audio, touch, button presses, stylus taps, etc. Additionally, input device may receive location information. Accordingly, input device 212 may include, for example, a camera, a microphone, one or more buttons, a touch screen, and/or a GPS receiver. Output device 214 may include a conventional mechanism that outputs information to the user, including a display (including a touch screen) and/or a speaker. Communication interface 216 may include any transceiver-like mechanism that enables computing device 200 to communicate with other devices and/or systems. For example, communication interface 216 may include mechanisms for communicating with another device or system via a network, such as network 110 (shown in FIG. 1).

As described herein, computing device 200 facilitates the pre-fetching content items for low-latency display to a user. Computing device 200 may perform these and other operations in response to processor 204 executing software instructions contained in a computer-readable medium, such as memory 206. A computer-readable medium may be defined as a physical or logical memory device and/or carrier wave. The software instructions may be read into memory 206 from another computer-readable medium, such as data storage device 210, or from another device via communication interface 216. The software instructions contained in memory 206 may cause processor 204 to perform processes described herein. Alternatively, hardwired circuitry may be used in place of or in combination with software instructions to implement processes consistent with the subject matter herein. Thus, implementations consistent with the principles of the subject matter disclosed herein are not limited to any specific combination of hardware circuitry and software.

The computing device 200 may be implemented in a number of different forms, as shown in FIG. 2. For example, it may be implemented as a standard server, or multiple times in a group of such servers. It may also be implemented as part of a rack server system. In addition, it may be implemented in a personal computer such as a laptop computer. Each of such devices may contain one or more of computing device 200, and an entire system may be made up of multiple computing devices 200 communicating with each other.

The processor 204 can execute instructions within the computing device 200, including instructions stored in the main memory 206. The processor may be implemented as chips that include separate and multiple analog and digital processors. The processor may provide, for example, for coordination of the other components of the device 200, such as control of user interfaces, applications run by device 200, and wireless communication by device 200.

Computing device 200 includes a processor 204, main memory 206, ROM 208, an input device 212, an output device such as a display 214, a communication interface 216, among other components including, for example, a receiver and a transceiver. The device 200 may also be provided with a storage device 210, such as a microdrive or other device, to provide additional storage. Each of the components are interconnected using various buses, and several of the components may be mounted on a common motherboard or in other manners as appropriate.

Computing device 200 may communicate wirelessly through communication interface 216, which may include digital signal processing circuitry where necessary. Communication interface 216 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver. In addition, short-range communication may occur, such as using a Bluetooth, WiFi, or other such transceiver (not shown). In addition, a GPS (Global Positioning system) receiver module may provide additional navigation- and location-related wireless data to device 200, which may be used as appropriate by applications running on device 200. Further, computing device 200 may include additional devices such as an accelerometer, a compass, a microphone, a camera, and a video and/or audio recorder.

Computing device 200 may also communicate audibly using an audio codec, which may receive spoken information from a user and convert it to usable digital information. The audio codec may likewise generate audible sound for a user, such as through a speaker, e.g., in a handset of device. Such sound may include sound from voice telephone calls, may include recorded sound (e.g., voice messages, music files, etc.) and may also include sound generated by applications operating on computing device 200.

Computing device 200 may be implemented in a number of different forms. For example, it may be implemented as a cellular telephone, or as part of a smart phone, personal digital assistant, a computer tablet, or other similar mobile device.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system (e.g., computing device 200) that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

In the example embodiment, computing device 200 is configured to pre-fetch and display content items to a viewer of publications such as video presentations. In some embodiments, computing device 200 is a mobile computing device that displays the publications and pre-fetched content items to a user. In other embodiments, computing device 200 is a remote computing device in communication with the user's display device and manages pre-fetching of content items to the user's device.

Figure 4:
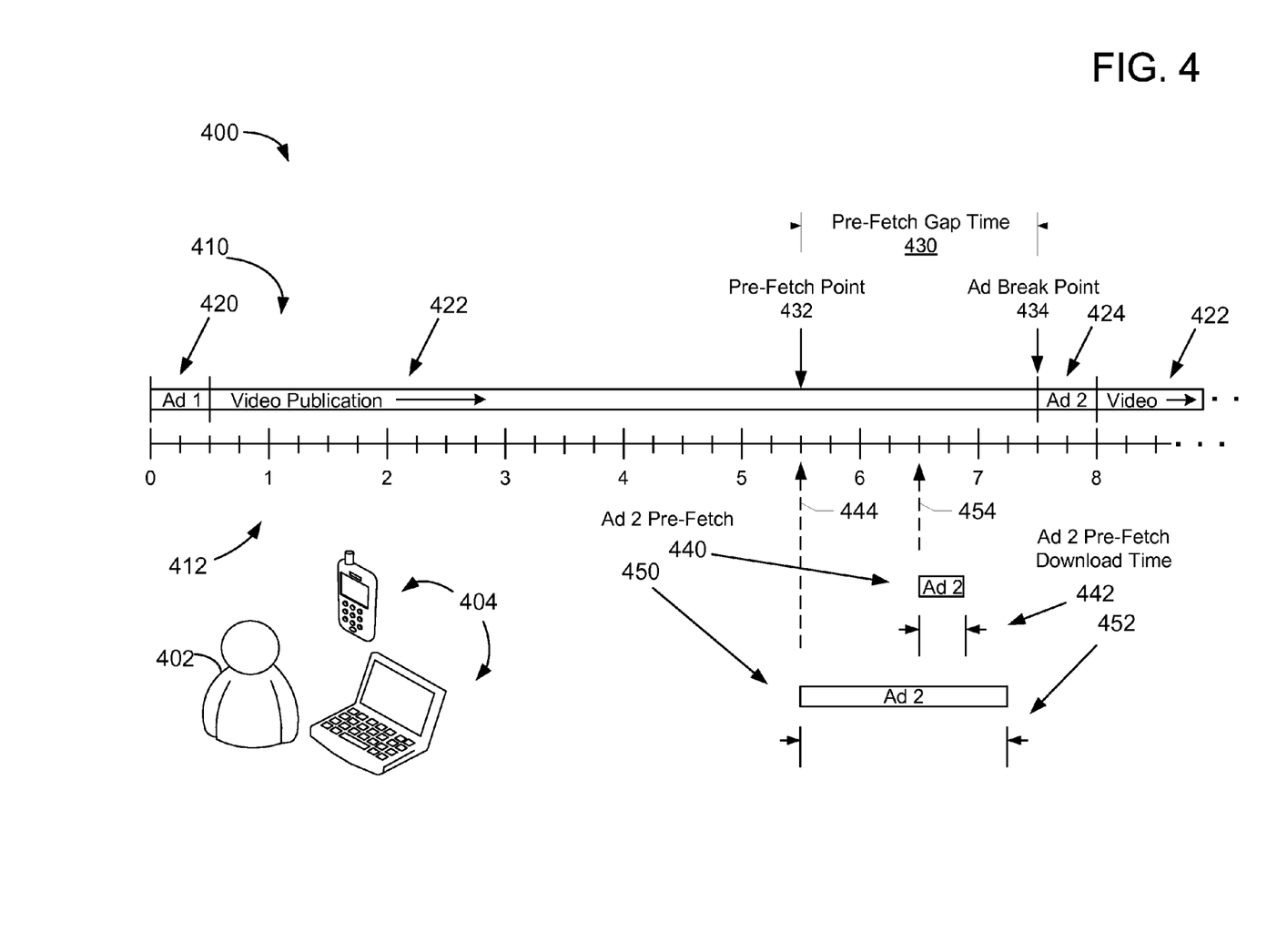
FIG. 4 is a diagram of an example timeline in which ads are pre-fetched for low latency display to a user using the networked environment shown in FIG. 2.

FIG. 4 is a diagram showing an example timeline 400 in which online content items (e.g., ads) are pre-fetched for low latency display to a user. In the example embodiment, a user 402 consumes a publication 422, such as an online video publication, using a computing device 404 such as a mobile phone or tablet computer. In some embodiments, user 402 is similar to users 150, 152, and 154 (shown in FIG. 1), and computing device 404 is similar to user access devices 108 (shown in FIG. 1). Further, in some embodiments, publications and content items are served and/or displayed in a networked environment similar to networked environment 100 (shown in FIG. 1). In other embodiments, publications and content items are served and/or displayed in an offline environment, for example where computing device 404 retrieves publications and content items stored on internal memory.

In the example illustrated in FIG. 4, a display timeline 410 illustrates the display of video publication 422 to user 402 along with two ads, "Ad 1" 420 and "Ad 2" 424. A time rule 412 is provided in FIG. 4, representing units of time in minutes, and beginning at a reference point t=0 seconds. Time rule 412 is aligned with display timeline 410 to facilitate discussion of event timings associated with online content presentation during the display of the video publication. As used herein, times referred to with variable t refer to times, in minutes from t=0, on time rule 412 and an associated point on display timeline 410.

In the example embodiment, user 402 initiates display of the video publication on computing device 404 at time t=0. Prior to beginning the display of presentation 422, computing device 404 displays Ad 1 420 from time t=0 to 0.5 minutes. In some embodiments, Ad 1 420 may be a pre-fetched video ad. As used herein, the term "pre-fetched," as used in reference to content items and video ads, indicates that some or all of the content item was downloaded (i.e., transmitted) to the presentation device (e.g., computing device 404) prior to the beginning of display of that content item. As such, the term "completely pre-fetched" indicates that the content item has been downloaded in its entirety prior to the beginning of display of that content item. Further, the term "partially pre-fetched" indicates that less than all of the content item has been downloaded prior to the beginning of display. For example, in some embodiments, Ad 1 420 is completely pre-fetched prior to time t=0, where in other embodiments, Ad 1 420 has a beginning portion (e.g., the first 5 seconds of Ad 1 420) pre-fetched prior to time t=0. Since Ad 1 420 is pre-fetched (e.g., stored locally), computing device 404 is able to being display of Ad 1 420 with low latency (e.g., with little delay waiting for the display of Ad 1 420 to begin).

At time t=0.5, in the example embodiment, the display of Ad 1 420 ends and computing device 404 begins displaying publication 422. In some embodiments, publication 422 is displayed until finished (e.g., completely displayed). In the example embodiment, the display of publication 422 is interrupted (e.g., displayed in segments) at an "ad break point" 434 at time t=7.5. As used herein, the term "ad break point", or just "break point", is used generally to refer to the point at which display of a publication ends or is otherwise paused, stopped, segmented, or interrupted, and a content item such as a pre-fetched ad may then be presented or displayed to the viewing user.

Further, in some embodiments, ad break point 434 is computed or otherwise determined by computing device 404. For example, and in the example embodiment, ad break point 434 is computed by computing device 404 as a point in time 7 minutes after the beginning of the display of publication 422 (e.g., 7 minutes after time t=0.5). In other embodiments, ad break point 434 is identified by a marker or other meta-data associated with publication 422 (e.g., a pre-defined break point that is defined within the publication as a suitable time to interrupt the publication for an ad). In still other embodiments, ad break point 434 is determined to be at a time corresponding to the end of display of publication 422. Any system or method for computing, identifying, or otherwise determining ad break points that enable the systems and methods described herein may be used.

In the example embodiment, computing device 404 also determines a "pre-fetch point" 432. As used herein, the term "pre-fetch point" is used generally to refer to the point at which pre-fetching of a content item such as Ad 2 424 begins. Further, as used herein, the term "pre-fetch gap time" is used generally to refer to an amount of time or a time window between a pre-fetch point and an ad break point (e.g., the 2 minutes between pre-fetch point 432 and ad break point 434).

In some embodiments, pre-fetch point 432 is a fixed amount of time prior to an ad break point. In other words, pre-fetch gap time 430 is a pre-defined amount of time, such as 15 seconds. In other embodiments, pre-fetch gap time 430 is computed based on the display time of the video publication (e.g., publication 422). For example, pre-fetch point may be computed to be half of the time of the segment of video publication (e.g., half of the time between t=0.5 minutes, the start of video publication 422, and t=7.5 minutes, the time of ad break point 434), resulting in a pre-fetch point 432 of t=4.0. In some embodiments, computing device computes pre-fetch point 432 by subtracting a pre-defined pre-fetch gap time 430 from ad break point 434. In other embodiments, pre-fetch point 432 may be computed relative to the beginning of the presentation of publication 422 (e.g., from time t=0.5 minutes) or relative to the beginning of the prior ad presentation (e.g., Ad 1 420 and time t=0.0 minutes). In still other embodiments, pre-fetch point 432 may be the beginning of display of the prior ad (e.g., Ad 1, at time t=0.0).

In other embodiments, pre-fetch gap time 430 and/or pre-fetch point 432 are computed values based on one or more factors. Some factors may be attributes of the next ad to be displayed (e.g., Ad 2 424), such as a file size (e.g., the size of Ad 2 424 in bytes) or a display length (e.g., how long Ad 2 takes to be displayed) of the next ad. For example, computing device 404 may compute pre-fetch point 432 to be 30 seconds before ad break point 434 (e.g., pre-fetch gap time=30 seconds) if Ad 2 is X bytes in length, or may compute pre-fetch point 432 to be 60 seconds before ad break point 434 if Ad 2 is X*2 bytes in length. Similarly, computing device 404 may compute pre-fetch point 432 to be 30 seconds before ad break point 434 if Ad 2 is a 15-second ad, or may compute pre-fetch point 432 to be 60 seconds before ad break point 434 if Ad 2 is a 30-second ad.

Other factors for computing pre-fetch gap time 430 and/or pre-fetch point 432 may be one or more attributes related to computing device 404, such as, for example: (a) a link quality or network latency between computing device 404 and a wireless network (not shown); (b) a download bandwidth rate between computing device 404 and the providers of online content (e.g., to the source of Ad 2 424); (c) available disk space or other memory on computing device 404; (d) user profile preference settings; (e) user behavior, such as how long the user is likely to watch the next ad, or how likely the user is to skip the next ad; (f) video quality of the next ad (e.g., resolution), which may take into account demographics, interests, gender, and/or watch history of the user; and (g) bitrate of computing device 404.

For example, computing device 404 may monitor the status of the wireless link and/or the download bandwidth associated either in general with the network or specifically with content providers. Presume, in scenario 450, that computing device 404 has a low bandwidth rate at a time leading up to the pre-fetching of Ad 2 424. Under this low bandwidth scenario 450, computing device 404 takes almost two minutes to download Ad 2 424. In other words, the pre-fetch download time 452 for Ad 2 424 is estimated to be approximately 1.8 minutes. As such, computing device 404 sets pre-fetch point 444 for Ad 2 424 in scenario 450 to begin at the 5.5 minute mark. In a higher bandwidth scenario 440, Ad2 424 has a pre-fetch download time 442 of less than 30 seconds. As such, computing device 404 sets pre-fetch point 454 for Ad 2 424 in scenario 440 to begin at the 6.5 minute mark.

Further, computing device 404 may compute pre-fetch gap time 430 and/or pre-fetch point 432 based on multiple factors such as, for example, the size of Ad 2 combined with the download bandwidth. Such factors allow computing device 404 to, for example, approximate download times for ads and delay the pre-fetch point (i.e., the point at which the next ad download is initiated) to be nearer the ad break point. In some embodiments, computing device 404 may compute pre-fetch gap time 430 such as to have the pre-fetch of Ad 2 424 finish at the time of ad break point 434. In other words, computing device 404 may attempt to have the pre-fetch start at a time such that pre-fetching is completing just in time to start the presentation of Ad 2 424. For example, if computing device 404 computes a pre-fetch gap time of 430 of 15 seconds based on one or more of the factors described herein, computing device 404 may begin pre-fetching at time t=7.25 minutes (i.e., ad break point t=7.5 minutes minus 0.25 minutes). As such, computing device 404 minimizes the amount of time between the conclusion of the pre-fetch operation and the beginning of presentation of the next ad (e.g., ad break point 434).

In some embodiments, the next ad (e.g., Ad 2 424) is only partially pre-fetched. In other words, and for example, only a first portion of Ad 2 424 is pre-fetched, such as the first five seconds of Ad 2 424. The length or size of this partial portion of the next ad is generally referred to herein as a "pre-fetch length." During or contemporaneous with the start of the display of the pre-fetched portion, computing device 404 may begin streaming or downloading the remainder of the next ad. As such, computing device 404 may start the pre-fetched ad with low latency, then simultaneously fetch or buffer the remainder for use as the displaying of the next ad continues. Partial pre-fetching may provide several benefits such as, for example, reducing unnecessary downloads in the case of abandoned views, reduced bandwidth consumption, and reducing the pre-fetch gap time (e.g., moving pre-fetch point 432 closer to ad break point 434).

In other embodiments, one or more of the above factors for computing pre-fetch gap time 430 may be used to determine values associated with partial pre-fetching of ads. For example, available disk space on computing device 404 may be used to limit the partial pre-fetch length of Ad 2 424 when disk space is constrained. Further, for another example, user preferences may determine the partial pre-fetch length of Ad 2 424. And in another example, user behavior may influence the partial pre-fetch length of Ad 2 424. For example, if user 402 regularly abandons (e.g., dismisses without fully viewing) ads within the first few seconds, then the partial pre-fetch length of Ad 2 424 may be reduced, or in some cases set to approximately the average viewing time before abandonment or slightly more. As such, only the portion that user 402 is likely to view will be pre-fetched by computing device 404.

In some embodiments, which ad to be displayed next (e.g., Ad 2 424) may be selected based at least in part on the publication currently being displayed (e.g., publication 422). For example, computing device 404 may identify attributes of publication 422, such as a category for the publication (e.g., publication 422 is related to automobiles), and may request the next ad to be related to automobiles (e.g., Ad 2 424 is for a car company). This relevance of publication 422 to the next ad to be served, Ad 2 424, may be weighted or otherwise incorporated with other known data such as a long-term profile of the user, or of the computing device, or a short-term profile or session information, or other data associated with user 402 such as search results history or online browsing history. As such, computing device 404 may identify a relevant next ad to pre-fetch.

In the example embodiment shown in FIG. 4, the next ad to be displayed (e.g., Ad 2 424) is a "midroll ad", or an add that is displayed within a single video publication (e.g., video publication 422, parts of which are presented before and after display of Ad 2 424). In other embodiments, the ad break point may be at or after the end of the video currently being displayed (e.g., video publication 422). In other words, the ad being pre-fetched may not be used until the beginning of the display of the next publication, such as, for example, in a sequential play or later play of two different video publications. For example, presume video publication 422 is the next publication to be displayed to user 402 such as, for example, through a later user choice, or in an auto-play sequence such as a playlist. Presume that Ad 1 is, thus, the "next ad" to be pre-fetched during the display of a prior video publication. In some embodiments, the end of a publication may be used as an ad break point, thereby enabling the pre-fetching of the next ad (e.g., the pre-fetching of Ad 1 420). As such, Ad 1 is pre-fetched during the display of the prior video publication, stored locally on computing device 404, and available for low latency display to user 402 upon initiation of video publication 422.

In the examples described herein, many of the steps are illustrated as being performed by the computing device that is displaying publications and content items (a "client device", e.g., computing device 404). However, it should be understood that many of these steps may in addition, or alternatively, be performed by a remote computing device (a "server device" or "server system", e.g., CMS 106, or a cloud computing device) in communication with the client device. In other words, and in the example embodiment, the pre-fetch system includes at least one "client device" in communication with at least one "server device", but many of the particular steps may be performed by either the "client device" or the "server device." For example, the server device may identify ads 420, 424 to be displayed to user 402, compute ad break points 434, pre-fetch gap times 430, and/or pre-fetch points 432, and transmit these elements of information to computing device 404 for use during the presentation of publication 422. Further, multiple remote computing devices may perform one or more of the steps described herein. For example, in one embodiment, CMS 106 acts as a central server for coordinating ad pre-fetching on computing device 404, and may retrieve content items and/or presentations from content providers 102 (shown in FIG. 2) and/or publishers 104 (shown in FIG. 2) via network 110. Content providers 102 and/or publishers 104 may also provide data associated with content items and publications that may be used by CMS 106 and/or computing device 404 to compute or otherwise determine one or more of ad break points 434, pre-fetch gap times 430, pre-fetch points 432, sizes or display times for ads 420, 424, and/or download times 442, 452 for content items.

Figure 5:
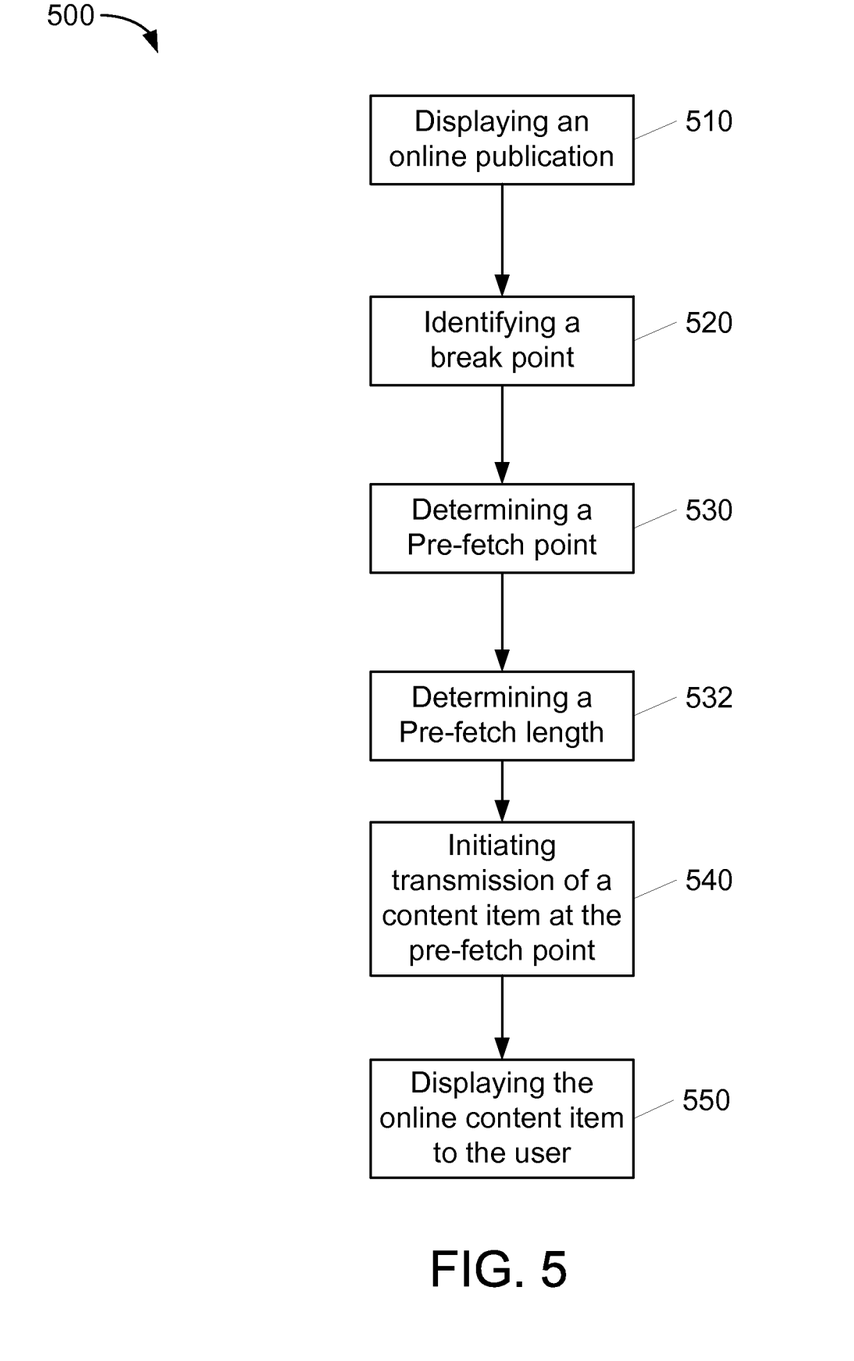
FIG. 5 is an example method for pre-fetching content items for low latency display to a user using the networked environment shown in FIG. 2.

FIG. 5 is an example method 500 for pre-fetching content items for low latency display to a user. In the example embodiment, method 500 is a computer-implemented method practiced in environment 100 (shown in FIG. 1) using one or more computing devices such as user access devices 108 (shown in FIG. 1), ad serving system 120 (shown in FIG. 1), content provider system 112 (shown in FIG. 1), publisher system 114, and/or computing device 404 (shown in FIG. 4), and includes at least one processor and a memory. Method 500 includes displaying 510 an online publication to a user using the output device. Method 500 also includes identifying 520 a break point associated with the online publication.

In the example embodiment, method 500 further includes determining 530, by the processor, a pre-fetch point prior to the break point. In some embodiments, determining 530 a pre-fetch point further includes determining a pre-fetch point that is a pre-determined amount of time prior to the break point. In some embodiments, determining 530 a pre-fetch point further includes computing a pre-fetch gap time based on one or more of a link quality of the first computing device, a bit rate of the first computing device, a size of the content item, and a download rate of the first computing device.

In the example embodiment, method 500 also includes initiating 540 transmission of a content item into the memory at the pre-fetch point. In some embodiments, method 500 further includes determining 532 a pre-fetch length of the content item that is less than a total length of the content item, and initiating 540 transmission of a content item further includes initiating transmission of a first portion of the content item approximately equal to the pre-fetch length. In some embodiments, determining a pre-fetch length further includes determining a pre-fetch length base on one or more of historical user behavior of the user, a user profile, a bit rate of the content item, and available storage space in the memory.

In some embodiments, method 500 also includes displaying 550 the online content item to the user using the output device. In other embodiments, selecting the content item based at least in part on one or more attributes of the online publication. In still other embodiments, the first computing device is a client device that includes the memory and the output device, and initiating 540 transmission of a content item includes initiating transmission of the content item from a second computing device to the first computing device, wherein the second computing device is a server device. In yet other embodiments, the first computing device is a server device, and initiating 540 transmission of a content item includes initiating transmission of the content item from the first computing device to a second computing device, wherein the second computing device is a client device that includes the memory and the output device.

Figure 6:
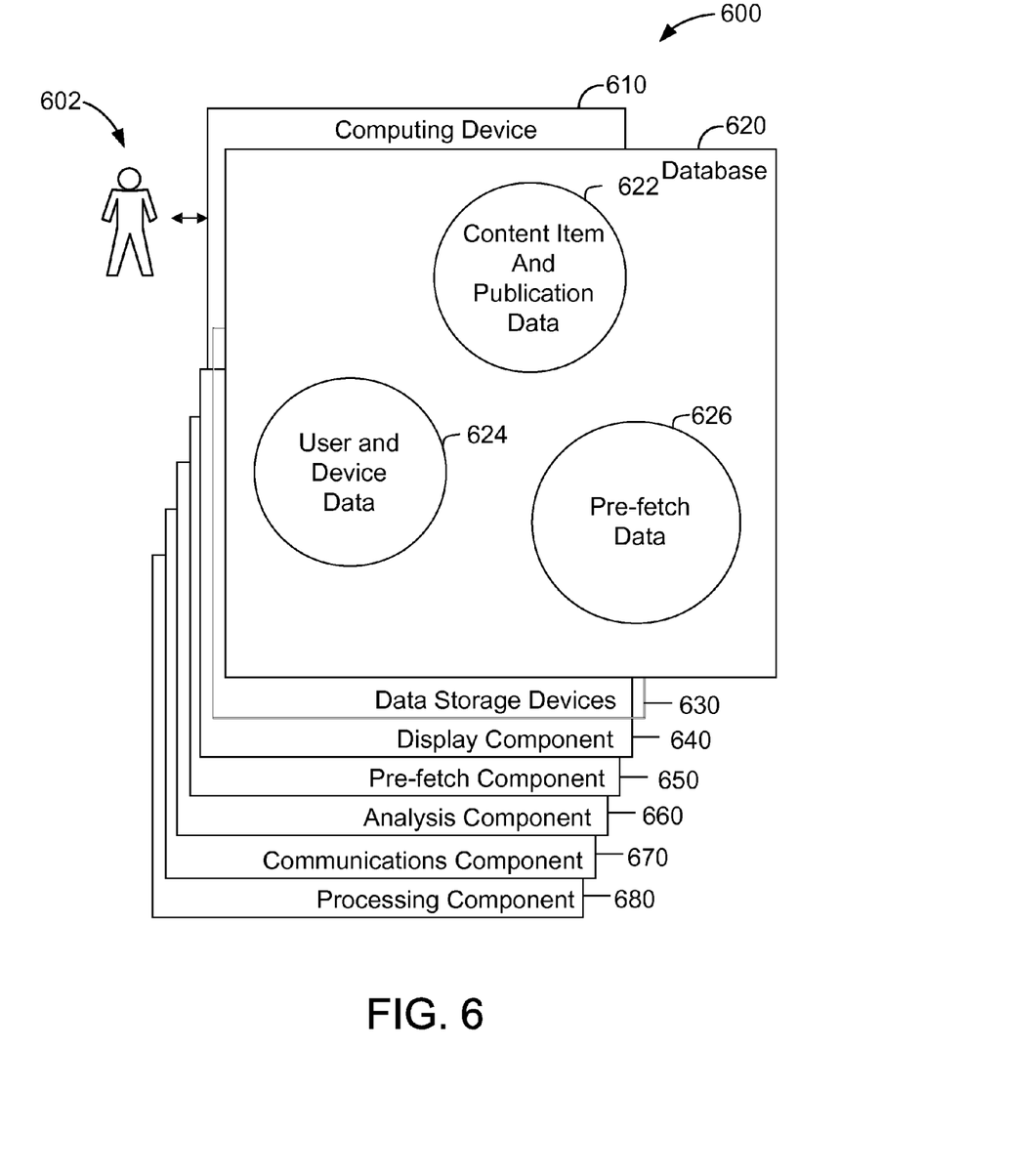
FIG. 6 shows an example configuration of a database within a computing device, along with other related computing components, that may be used to pre-fetch content items such as video ads for presentation to a user during the presentation of a publication such as the viewing of an online video.

FIG. 6 shows an example configuration 600 of a database 620 within a computing device 610, along with other related computing components, that may be used to pre-fetch content items such as video ads for presentation to a user during the presentation of a publication such as the viewing of an online video. Computing device 610 may operate in a networked environment such as environment 100 (shown in FIG. 2). In some embodiments, computing device 610 is similar to user access devices 108 (shown in FIG. 1), ad serving system 120 (shown in FIG. 1), content provider system 112 (shown in FIG. 1), publisher system 114, and/or computing device 404 (shown in FIG. 4). In other embodiments, database 620 may be files cached on a local storage device, such as memory or disk storage. Database 620 is coupled to several separate components within computing device 610, which perform specific tasks.

In the example embodiment, database 620 includes content item and publication data 622, user and device data 624, and pre-fetch data 626. Content item and publication data 622 includes information associated with content items such as ads 420, 424 (shown in FIG. 4) and publications such as video publication 422 (shown in FIG. 4). User and device data 624 includes information associated with computing devices and networks such as computing device 404 (shown in FIG. 4)

and network 110 (shown in FIG. 2). Pre-fetch data 626 includes data associated with pre-fetching content items as described herein.

Computing device 610 includes the database 620, as well as data storage devices 630. Computing device 610 also includes a display component 640 for presenting content items and publications to a user 602, or user 402 (shown in FIG. 4). Computing device 610 also includes a pre-fetch component 650 for pre-fetching content items for later display. Computing device 610 also includes an analysis component 660 for computing certain values associated with pre-fetching content items. A communications component 670 is also included for communicating with other servers or entities during pre-fetching and display operations. A processing component 680 assists with execution of computer-executable instructions associated with the system.

It will be appreciated that the above embodiments that have been described in particular detail are merely example or possible embodiments, and that there are many other combinations, additions, or alternatives that may be included.

Also, the particular naming of the components, capitalization of terms, the attributes, data structures, or any other programming or structural aspect is not mandatory or significant, and the mechanisms that implement the embodiments or its features may have different names, formats, or protocols. Further, the system may be implemented via a combination of hardware and software, as described, or entirely in hardware elements. Also, the particular division of functionality between the various system components described herein is merely exemplary, and not mandatory; functions performed by a single system component may instead be performed by multiple components, and functions performed by multiple components may instead performed by a single component.

Some portions of above description present features in terms of algorithms and symbolic representations of operations on information. These algorithmic descriptions and representations may be used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "processing" or "computing" or "calculating" or "determining" or "displaying" or "providing" "retrieving" "receiving" or the like, refer to the action and processes of a computer system, or similar electronic computing device, that manipulates and transforms data represented as physical (electronic) quantities within the computer system memories or registers or other such information storage, transmission or display devices.

Based on the foregoing specification, the above-discussed embodiments of the disclosure may be implemented using computer programming or engineering techniques including computer software, firmware, hardware or any combination or subset thereof. Any such resulting program, having computer-readable and/or computer-executable instructions, may be embodied or provided within one or more computer-readable media, thereby making a computer program product, i.e., an article of manufacture, according to the discussed embodiments of the disclosure. The computer readable media may be, for instance, a fixed (hard) drive, diskette, optical disk, magnetic tape, semiconductor memory such as read-only memory (ROM) or flash memory, etc., or any transmitting/receiving medium such as the Internet or other communication network or link. The article of manufacture containing the computer code may be made and/or used by executing the instructions directly from one medium, by copying the code from one medium to another medium, or by transmitting the code over a network.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal used to provide machine instructions and/or data to a programmable processor.

While the disclosure has been described in terms of various specific embodiments, it will be recognized that the disclosure can be practiced with modification within the spirit and scope of the claims.

What is claimed is:

1. A computer-implemented method for pre-fetching online content items, the method using a first computing device including a processor in communication with an output device and a memory, the method comprising:
   displaying an online publication to a user using the output device;
   identifying a break point associated with the online publication;
   determining an estimated display duration of a subset of a first content item that the user will likely watch based on a viewing history of the user;
   determining a pre-fetch point prior to the break point based on the estimated display duration; and
   initiating transmission of the subset of the first content item into the memory at the pre-fetch point.

2. The method of claim 1 further comprising displaying the online content item to the user using the output device.

3. The method of claim 1, wherein determining the pre-fetch point further includes determining that the pre-fetch point occurs at a pre-determined amount of time prior to the break point.

4. The method of claim 1, wherein determining the pre-fetch point further includes computing a pre-fetch gap time based on one or more of a link quality of the first computing device, a bit rate of the first computing device, a size of the content item, and a download rate of the first computing device.

5. The method of claim 1 further comprising determining a pre-fetch length of the content item that is less than a total length of the content item, wherein initiating transmission of a content item further includes initiating transmission of a first portion of the content item approximately equal to the pre-fetch length.

6. The method of claim 5, wherein determining a pre-fetch length further includes determining a pre-fetch length based on one or more of historical user behavior of the user, a user profile, a bit rate of the content item, and available storage space in the memory.

7. The method of claim 1 further comprising selecting the content item based at least in part on one or more attributes of the online publication.

8. The method of claim 1, wherein the first computing device is a client device that includes the memory and the output device, wherein initiating transmission of at least a portion of the content item includes initiating transmission of at least a portion of the content item from a second computing device to the first computing device, wherein the second computing device is a server device.

9. The method of claim 1, wherein the first computing device is a server device, wherein initiating transmission of at least a portion of the content item includes initiating transmission of at least a portion of the content item from the first computing device to a second computing device, wherein the second computing device is a client device that includes the memory and the output device.

10. A computer system comprising:
an output device;
at least one memory; and
one or more processors configured to:
  display an online publication to a user using the output device;
  identify a break point associated with the online publication;
  determine an estimated display duration of a subset of a first content item that the user will likely watch based on a viewing history of the user;
  determine a pre-fetch point prior to the break point based on the estimated display duration; and
  initiate transmission of the subset of the first content item into the memory at the pre-fetch point.

11. The computer system of claim 10, wherein the at least one processor is further configured to display the online content item to the user using the output device.

12. The computer system of claim 10, wherein determining the pre-fetch point further includes determining that the pre-fetch point occurs at a pre-determined amount of time prior to the break point.

13. The computer system of claim 10, wherein determining the pre-fetch point further includes computing a pre-fetch gap time based on one or more of a link quality of the first computing device, a bit rate of the first computing device, a size of the content item, and a download rate of the first computing device.

14. The computer system of claim 10, wherein the at least one processor is further configured to determine a pre-fetch length of the content item that is less than a total length of the content item, wherein initiating transmission of at least a portion of the content item further includes initiating transmission of a first portion of the content item approximately equal to the pre-fetch length.

15. The computer system of claim 14, wherein determining a pre-fetch length further includes determining a pre-fetch length based on one or more of historical user behavior of the user, a user profile, a bit rate of the content item, and available storage space in the memory.

16. The computer system of claim 10, wherein the at least one processor is further configured to select the content item based at least in part on one or more attributes of the online publication.

17. The computer system of claim 10, wherein a first computing device is a client device that includes the memory and the output device, wherein initiating transmission of at least a portion of the content item includes initiating transmission of at least a portion of the content item from a second computing device to the first computing device, wherein the second computing device is a server device.

18. The computer system of claim 10, wherein a first computing device is a server device, wherein initiating transmission of at least a portion of the content item includes initiating transmission of at least a portion of the content item from the first computing device to a second computing device, wherein the second computing device is a client device that includes the memory and the output device.

19. A non-transitory computer-readable storage media having computer-executable instructions embodied thereon, wherein, when executed by at least one processor, the computer-executable instructions cause the processor to:
display an online publication to a user using an output device;
identify a break point associated with the online publication;
determine an estimated display duration of a subset of a first content item that the user will likely watch based on a viewing history of the user;
determine a pre-fetch point prior to the break point based on the estimated display duration; and
initiate transmission of the subset of the first content item into the memory at the pre-fetch point.

20. The non-transitory computer-readable storage media of claim 19, wherein the computer-executable instructions further cause the processor to display the online content item to the user using the output device.

21. The non-transitory computer-readable storage media of claim 19, wherein determining the pre-fetch point further includes determining that the pre-fetch point occurs at a pre-determined amount of time prior to the break point.

22. The non-transitory computer-readable storage media of claim 19, wherein determining the pre-fetch point further includes computing a pre-fetch gap time based on one or more of a link quality of the first computing device, a bit rate of the first computing device, a size of the content item, and a download rate of the first computing device.

23. The non-transitory computer-readable storage media of claim 19, wherein the computer-executable instructions further cause the processor to determine a pre-fetch length of the content item that is less than a total length of the content item, wherein initiating transmission of at least a portion of the content item further includes initiating transmission of a first portion of the content item approximately equal to the pre-fetch length.

24. The non-transitory computer-readable storage media of claim 23, wherein determining a pre-fetch length further includes determining a pre-fetch length based on one or more of historical user behavior of the user, a user profile, a bit rate of the content item, and available storage space in the memory.

25. The non-transitory computer-readable storage media of claim 19, wherein the computer-executable instructions further cause the processor to select the content item based at least in part on one or more attributes of the online publication.

26. A computer device comprising one or more processors in communication with a client device including a memory and an output device, the computer device configured to:
display an online publication to a user using the output device;
identify a break point associated with the online publication;
determine an estimated display duration of a subset of a first content item that the user will likely watch based on a viewing history of the user;

determine a pre-fetch point prior to the break point based on the estimated display duration; and initiate transmission of the subset of the first content item into the memory at the pre-fetch point.

27. The computer device of claim 26, wherein the computer device is further configured to display the online content item to the user using the output device.

28. The computer device of claim 26, wherein determining the pre-fetch point further includes determining that the pre-fetch point occurs at a pre-determined amount of time prior to the break point.

29. The computer device of claim 26, wherein determining the pre-fetch point further includes computing a pre-fetch gap time based on one or more of a link quality of the first computing device, a bit rate of the first computing device, a size of the content item, and a download rate of the first computing device.

30. The computer device of claim 26, wherein the computer device is further configured to determine a pre-fetch length of the content item that is less than a total length of the content item, wherein initiating transmission of at least a portion of the content item further includes initiating transmission of a first portion of the content item approximately equal to the pre-fetch length.

31. The computer device of claim 30, wherein determining a pre-fetch length further includes determining a pre-fetch length based on one or more of historical user behavior of the user, a user profile, a bit rate of the content item, and available storage space in the memory.

32. The computer device of claim 26, herein the computer device is further configured to select the content item based at least in part on one or more attributes of the online publication.

* * * * *